Dec. 28, 1937.　　　　H. J. SCHRADER　　　　2,103,341
MODULATION METERING DEVICE
Filed Jan. 28, 1936
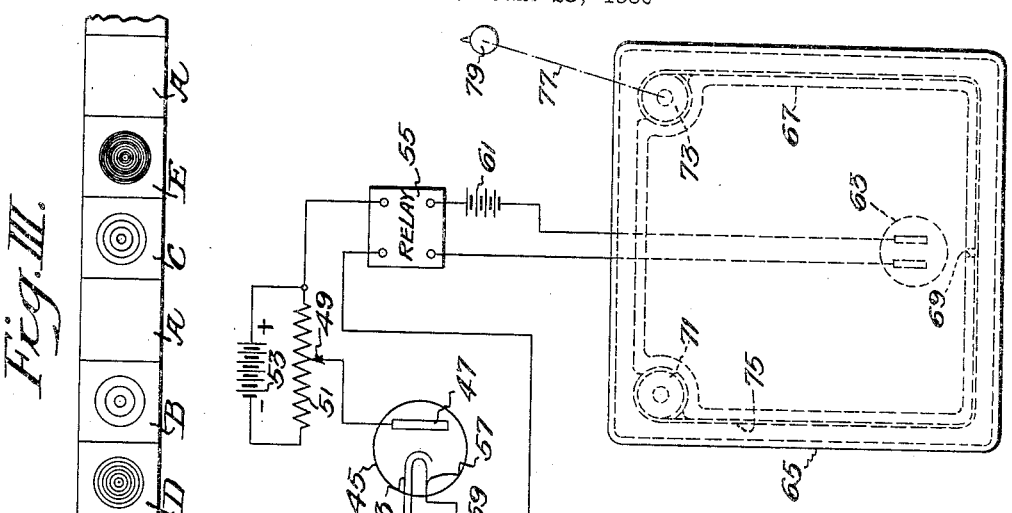
Fig. III.
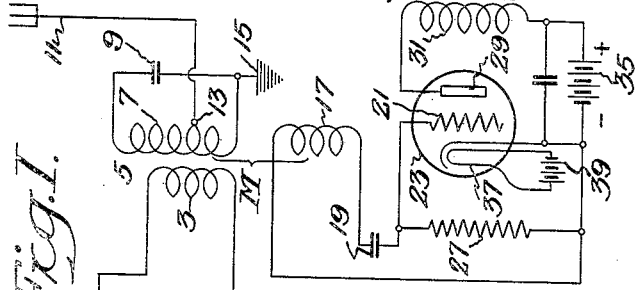
Fig. I.
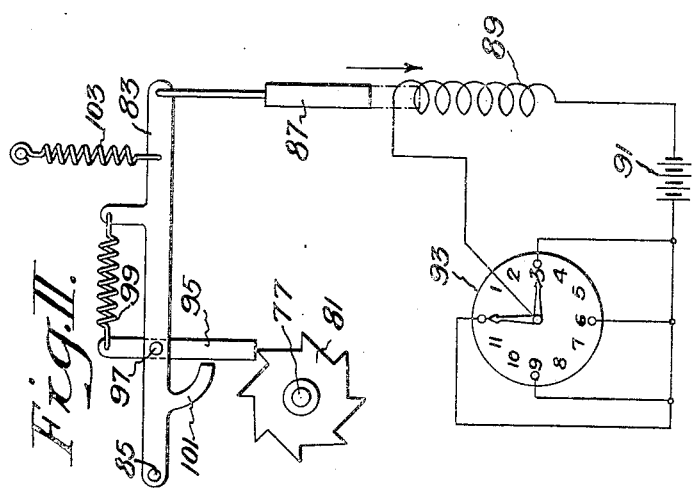
Fig. II.
Witnesses
Inventor
Harold J. Schrader
by
Attorney.

Patented Dec. 28, 1937

2,103,341

UNITED STATES PATENT OFFICE 2,103,341

MODULATION METERING DEVICE

Harold J. Schrader, Haddon Heights, N. J., assignor to Radio Corporation of America, a corporation of Delaware Application January 28, 1936, Serial No. 61,150

6 Claims. (Cl. 179—171)

My invention relates to modulation metering devices for radio frequency carrier currents. More specifically, my invention is a modulation meter which records the amount of overmodulation of a radio transmitter during a definite period of time.

I am aware of modulation meters which operate by the flashing of a lamp, the operation of an alarm or by operating a counter. Modulation devices of this type do not make a permanent record of the percentage of time a carrier current is overmodulated. Furthermore, this type of modulation indicator does not indicate the amount of overmodulation occurring during a particular period.

I propose to operate the overmodulation indicator of my invention so as to make a permanent record which will indicate the percentage of time a carrier current is overmodulated.

One of the objects of my invention is to make a permanent record which shows the percentage of time of overmodulation of a radio transmitter.

Another object is to record the overmodulation of a radio transmitter during predetermined intervals.

An additional object of my invention is to provide means whereby the overmodulation of a radio transmitter will be recorded on a light-sensitive paper or film.

My invention may be best understood by reference to the accompanying drawing, in which Figure I is a schematic diagram showing one embodiment of my modulation recorder, Fig. II is a schematic illustration of an automatic means for moving the recording paper or film, and Fig. III is an illustration which shows the overmodulation effects as they are recorded.

In Fig. I a source of modulating radio frequency energy is represented by the reference numeral 1. This source is coupled to the primary 3 of a radio frequency transformer 5. The secondary 7 of this transformer may be tuned to resonance by a capacitor 9. An antenna 11 is connected to a tap 13 on the secondary winding 7. This tuned circuit is preferably grounded at 15. An inductor 17 is mutually coupled to the tuned antenna circuit 7—9—11.

One of the terminals of this inductor is connected to the grid capacitor 19. The other terminal of this capacitor is connected to the grid 21 of a thermionic detector tube 23. The cathode 25 of this tube is connected to the remaining terminal of the inductor 17. A grid leak resistor 27 is connected between grid and cathode.

The anode 29 of the detector tube is connected through the primary 31 of the audio frequency transformer 33 to the positive terminal of a B battery 35. The negative terminal of the B battery is connected to cathode. A heater 37 is energized by a battery 39 or any other suitable source.

The secondary 41 of the audio frequency transformer is connected to the cathode 43 of a diode rectifier 45. The anode 47 of this rectifier is connected to the slider 49 of a potentiometer 51. A biasing battery 53 is connected across the potentiometer. The positive terminal of this battery is connected to one of the input terminals of a relay 55. The other input terminal of this relay is connected to the remaining terminal of the secondary of the audio frequency transformer 41. A heater 57 is energized by a battery 59, or the like.

The relay which is connected to the diode rectifier may be of any conventional type; by way of example, a Thyratron may be used. The output terminals of this relay are connected through a suitable source of power 61 to an illuminating device 63, which by preference is a neon tube. The source of power 61 is sufficient to operate the neon tube. The neon tube is located within a light-tight box 65. Within this light-tight box is a second box 67 which is closed on all sides with a suitable diaphragm opening 69, which is positioned opposite the neon light 63.

In suitable supports at the rear of the inner box are arranged a pair of spools 71, 73. Around the first of these spools is rolled a suitable supply of unexposed photographic film or light sensitive paper. The film 75 is carried around the front and sides of the inner box 67 to the spool 73. The photographic film is suitably secured to this spool on which it is rolled after it has been exposed. The take-up spool 73 may be connected by means of a suitable shaft 77 to a take-up handle or knob 79.

By way of example, the film may be of the ordinary type employed in small cameras or in place of film a light-sensitive paper may be employed. The film width may be of the order of one to two inches and the diaphragm may expose a suitable section of film of the order of one square inch.

In the arrangement just described, a manual movement of the film is contemplated. I have found that the film may be exposed for fifteen minute intervals. An exposure of this kind ordinarily provides sufficient information as to the percentage of time overmodulation has occurred. However, longer or shorter intervals may be used.

In the event that automatic operation is desired I have illustrated in Fig. II one means for automatically moving the film at predetermined intervals. A suitable ratchet wheel 81 is mounted on the shaft 77. A lever 83 is pivoted about the bearing 85. An armature 87 is pivotally mounted on the free end of the lever 83. This armature is arranged to enter the solenoid winding 89 when the same is energized by a battery 91.

An electrical timepiece 93 has been arranged so that a contact is completed every fifteen minutes. This contact completes the circuit from the battery 91 through the solenoid winding. It is not necessary that the contact be continued over an appreciable time interval. The contact should be continued long enough for the armature 87 to be drawn within the solenoid winding.

It will be seen that on each downward stroke an arm 95 engages a tooth of the ratchet wheel 81. This arm 95 is pivotally mounted at the end 97 of the lever arm 83. A spring member 99 normally holds the arm against a stop 101. The spring 99 permits the arm 95 to move away from the center of the ratchet wheel on each downward stroke and toward the center of the wheel on each upward stroke. A spring 103 is secured near the free end of the lever 83 to return the lever to its starting position after every downward stroke. In the illustration, the lever mechanism is shown as it is about to start a downward stroke.

The operation of my invention may be briefly described as follows: A radio frequency carrier current is supplied to the antenna. This carrier current is modulated by an audio frequency current. The ratio between the two currents is called the percentage of modulation. If the percentage of modulation is very low, the transmitter is not efficiently operated. On the other hand, 100% modulation is the theoretical maximum limit for high quality transmission. It is desirable to approach this limit, but it should not be continuously exceeded. It is possible to exceed the established limit for a relatively small percentage of the time without serious distortion. It is, therefore, desirable to provide means for observing the percentage of time that a carrier is overmodulated.

In the circuit of Fig. 1 the combined carrier and modulation currents are impressed on the detector 23. The detector demodulates the impressed currents and provides an audio frequency current corresponding to the original modulation. This audio frequency current is impressed across the diode rectifier 45. The potentiometer in the diode circuit is used to bias the rectifier to prevent the rectification of currents below the normal percentage of modulation.

As the bias is exceeded by modulation currents, or peaks thereof, greater than normal modulation, a rectified current will flow through the diode and operate the relay or Thyratron in the diode circuit. The relay in turn completes the circuit of the power supply which illuminates the neon lamp which is housed within the photographic device.

The photographic equipment, as previously explained, includes a light-sensitive paper or film. A single peak of overmodulation is registered on the film with a given density. A second overmodulation peak will increase the amount of light reaching the film and thereby further increase the density of the exposure. Likewise, the greater the duration of an overmodulation peaker, the greater the exposure.

By way of example, Fig. III illustrates the effect of varying light exposures. The sections represented by A compare with no overmodulation. The section represented by B shows slight overmodulation. The section C is permissible overmodulation. The section D represents the upper limit of overmodulation. The section E corresponds to badly overmodulated transmission. Actually, the film will show exposures gradually varying from light gray to black, but for purposes of illustration shaded lines are shown.

While the light-sensitive film may be moved manually, I prefer to automatically advance the film every fifteen minutes. Each section of the film such as A, B, C, D and E corresponds to fifteen minute intervals of station operation. By examining the film, the radio station manager may easily determine if the station has been properly operated at its maximum efficiency. It should be understood that the method described shows the percentage of time overmodulation has occurred rather than the number of times overmodulation peaks occur. The percentage of time is, of course, the total time the film is in a given position to the amount of time the light is illuminated. The film must, of course, be developed and the film density must be calibrated and examined to arrive at proper standards of comparison.

Although I have shown a separate detector and rectifier, it should be understood that the two functions may be combined in a single device. In a similar manner, the pickup may be coupled to the antenna or any other suitable point in the system. I have previously explained that the relay device may be any of the well known relays. The photographic recording device may be designed to use light-sensitive film or paper which may be moved in any convenient manner.

I claim as my invention:—

1. In a modulation metering device, a circuit including a rectifier, relay, and illumination means, means for impressing modulated carrier current on said circuit, means for biasing said rectifier to prevent rectification of currents below a predetermined level, currents exceeding said bias corresponding to overmodulation, a source of power, means connecting said source to said illumination means and to said relay whereby the operation of the relay applies power to said illumination means during intervals when said modulation exceeds said predetermined level, and light sensitive means for recording said illumination.

2. In a device of the character of claim 1, means for adjusting the bias on said rectifier to values corresponding to predetermined percentages of modulation of said carrier currents.

3. In a device of the character of claim 1, means for intermittently moving said light sensitive recording means a predetermined amount at regular intervals in such manner that the density of the exposures indicate the percentage of time said carrier current is overmodulated during the periods said film is stationary.

4. In a modulation metering device, a circuit including a rectifier, relay, and illumination means, means for impressing modulated carrier currents on said circuit, means for biasing said rectifier to prevent rectification of currents below a predetermined level, currents exceeding said bias corresponding to overmodulation, a source of power, means connecting said source to said illumination means and to said relay whereby the operation of the relay applies power to said illumination means, and means for recording indications from which the percentage of time said carrier current is overmodulated may be determined.

5. In a modulation meter of the character described, a detector, means for impressing a modulated carrier current on said detector, a rectifier effectively connected to the output of said detector, means for biasing said rectifier whereby rectification only takes place for currents exceeding a predetermined level, currents exceeding said bias corresponding to overmodulation, relay means associated with said rectifier, a source of power controlled by said relay, illumination means operated by said relay, and a light sensitive means for recording said illumination in such manner that the sum of the overmodulation intervals for a finite period may be indicated.

6. In a modulation meter of the character described, a detector, means for impressing a modulated carrier current on said detector, a rectifier effectively connected to the output of said detector, means for biasing said rectifier whereby rectification only takes place for currents exceeding a predetermined level, currents exceeding said bias corresponding to overmodulation, relay means associated with said rectifier, a source of power controlled by said relay, illumination means operated by said relay during intervals when said predetermined level is exceeded, and means for recording indications from which the percentage of time said carrier current is overmodulated may be determined.

HAROLD J. SCHRADER.